UNITED STATES PATENT OFFICE.

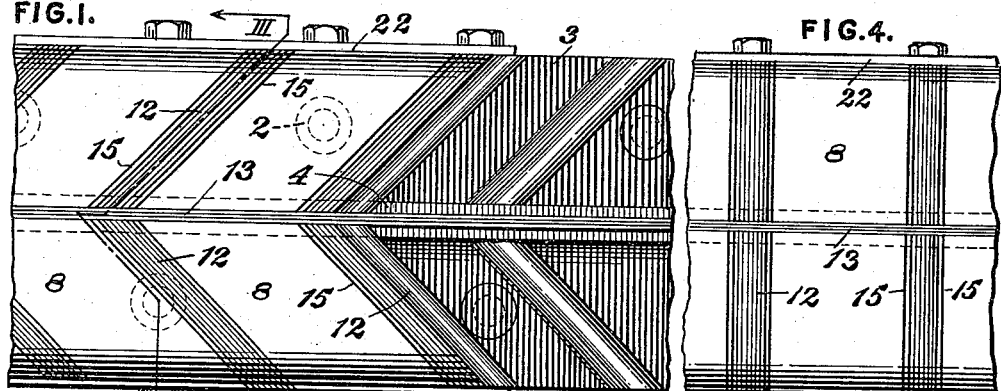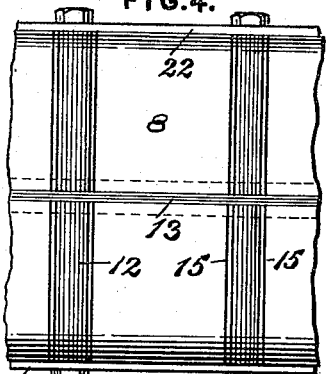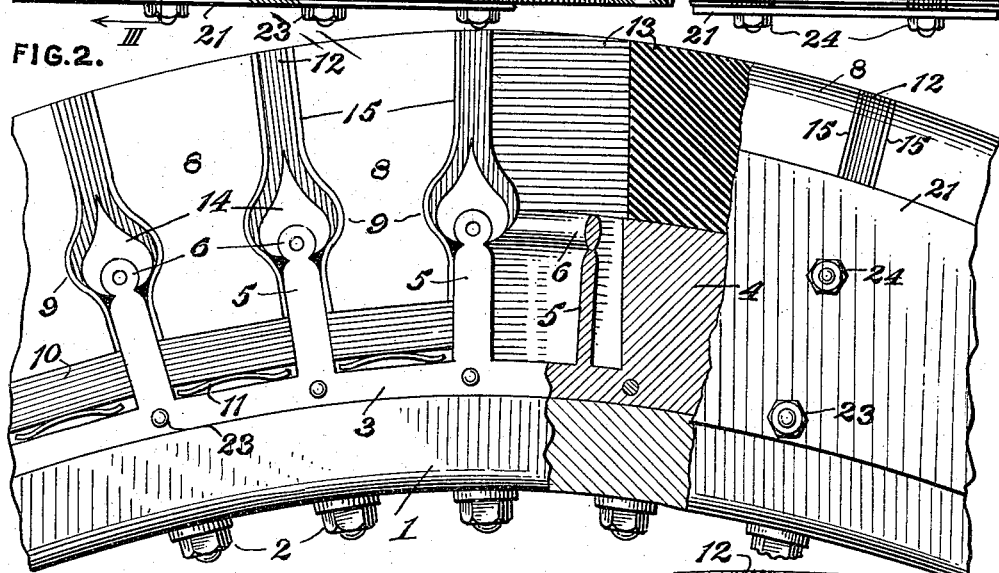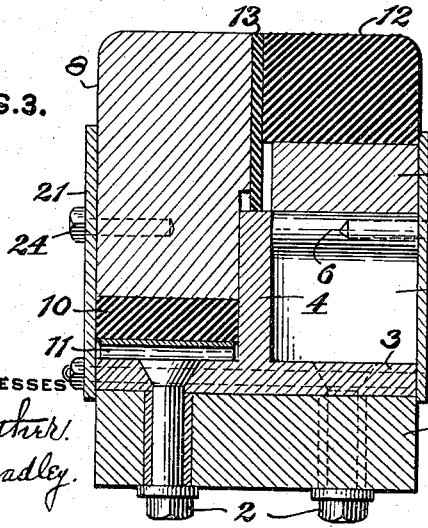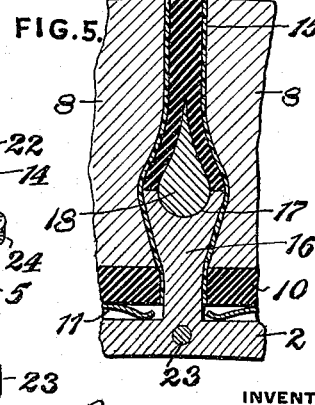

JOHN J. MARSULA, OF PITTSBURGH, PENNSYLVANIA.

TIRE FOR VEHICLE-WHEELS.

1,147,111.

Specification of Letters Patent.

Patented July 20, 1915.

Application filed January 9, 1913. Serial No. 740,965.

*To all whom it may concern:*

Be it known that I, JOHN J. MARSULA, of Pittsburgh, in the county of Allegheny and State of Pennsylvania, have invented certain new and useful Improvements in Tires for Vehicle-Wheels, of which the following is a specification.

The prime object of my invention is to provide a new and improved resilient tire for vehicles, and particularly a tire of this character especially applicable for use on wheels of heavy vehicles, although it may be employed for light vehicles.

In the accompanying drawing, which illustrates applications of my invention, Figure 1 is a part plan and a part sectional view of a tire embodying my invention; Fig. 2, a part side elevational view and a part sectional view; Fig. 3, a sectional view taken on line III—III of Fig. 1; Fig. 4, a plan of a modified form; and Fig. 5, a sectional view of a still further modified form of my invention.

Referring to the drawing, 1 designates a felly of a wheel to which my tire is adapted to be secured by means of bolts 2, or in any other suitable manner.

The tire proper comprises a rim portion 3 which is adapted to be mounted on the felly of the wheel and in the forms illustrated, the rim is provided with a longitudinally extending and centrally disposed lug or annular flange 4, extending throughout the circumference of the rim. The rim is preferably made of metal and may consist of a continuous band or a band made up of sections.

Located on each side of the lug 4 and preferably formed integral with the rim, I provide a series of spaced outwardly projecting members 5. These members 5 may be disposed as shown by the form of Fig. 1, or they may be arranged at right angles with the upright 4 as shown by the form of Fig. 4. Members 5, in the form of Fig. 1, are provided with a rounded head or ball 6 respectively designed to coöperate with a wedging member, as hereinafter described.

Entered between the members 5 and projecting outwardly above said member, and located on opposite sides of the central lug 4, I provide a series of blocks 8. Blocks 8 are preferably of wood which has been treated for the purpose of rendering the wood efficient for use in this construction, although I do not desire to limit myself to wooden blocks.

As illustrated, the blocks 8 are formed with concaved portions or grooves 9, designed to coöperate with means for clamping and maintaining the blocks in operative positions when the parts constituting the tire are assembled. In assembling the parts, the blocks are placed in position by introducing them into the spaces between the members 5 from the side edges of the tire and moving them laterally thereof into contact with the outstanding lug or partition 4.

As shown and as preferred, the blocks 8 are designed to rest upon a series of resilient members 10, preferably formed of rubber or other suitable material, and interposed between the said resilient members 10 and the rim of the tire, I provide a series of springs 11.

Extending transversely of the tire and located between the respective blocks 8, I provide a series of members 12 of resilient material, which members maintain the blocks in spacing relation one to another. Encircling the annular lug 4, is a resilient member or ring 13 designed to provide a yielding bearing between the two divided series of blocks, see Fig. 3.

Coöperating with the rounded heads of members 5, and designed to enter a slit formed in the respective resilient members 12, is a series of wedging and connecting pieces 14. These wedging pieces 14 expand the resilient members 12 along their inner edges forcing a portion of the material thereof into the grooves 9 of the blocks 8, and coact with the heads 5 to form a tongue and socket connection.

15 designate metallic strips interposed between the members 12 and the blocks 8 and extend outwardly to the periphery of the tire entering into the formation of the tread-surface.

In the form of my invention as illustrated by Fig. 5, the centrally disposed lug 16 is formed with a groove 17 in place of the rounded head of the form of Fig. 1, and in this construction, I have shown a spacing member 18 having a rounded portion adapted to fit in the groove of member 16.

The tire is provided with side plate members 21, 22, secured to the sides of the tire by a series of laterally extending bolts 23 and 24. Bolts 24 are designed to be passed through apertures formed in the heads 6 of members 5.

As will be seen, the arrangement is such as to provide an inward yielding of the blocks in service, but with this movement resisted not only at the bottom of the block but also at its sides, the resistance at each point rapidly increasing with increase in movement. This is due to the fact that inward movement of a block tends to compress the divided part of the member 12, and at the same time more firmly lock the blocks in position due to this increase in pressure being placed on the inwardly curved portions of the blocks. And since the members 14 have an action somewhat along the lines of a tongue and socket, the pressure will be distributed in the direction of length of the series of blocks, it being understood that the blocks themselves are held in position entirely by the particular key-like arrangement provided by the recessed portions of the block, the members 12 and the members 14.

It will be readily understood from the above description that the tire may be made considerably wider than the tire illustrated by the drawing by adding one or more sets of blocks and the coöperating parts, or that it may be made narrower than the tire illustrated by omitting one of the sets or series of blocks.

What I claim is:—

1. In a vehicle tire, a rim having a plurality of outwardly projecting members, blocks positionable between pairs of members and projecting thereabove, an element carried by each projecting member and extending into the space between adjacent blocks, and a resilient member between adjacent blocks, each element and the faces of the blocks opposing it being complementally formed to provide a wedge action on the adjacent resilient member under inward pressure on the pair of blocks, whereby said resilient member will provide a resistance against such inward movement increasing with the increase in the length of such movement.

2. In a vehicle tire, a rim having a plurality of outwardly projecting members, blocks positionable between pairs of members and projecting thereabove, an element carried by each projecting member and extending into the space between adjacent blocks, and a resilient member between adjacent blocks, each element and the faces of the blocks opposing it being complementally formed to provide a wedge action on the adjacent resilient member under inward pressure on the pair of blocks, whereby said resilient member will provide a resistance against such inward movement increasing with the increase in the length of such movement, said element and projecting member being complementally formed to permit distribution of pressure from one block to another.

3. In a vehicle tire, a rim having a plurality of outwardly projecting members, blocks positionable between pairs of members and projecting thereabove, an element carried by each projecting member and extending into the space between adjacent blocks, and a resilient member between adjacent blocks, each element and the faces of the blocks opposing it being complementally formed to provide a wedge action on the adjacent resilient member under inward pressure on the pair of blocks, whereby said resilient member will provide a resistance against such inward movement increasing with the increase in the length of such movement, said element being in the form of an expander with its sides diverging inwardly toward the rim.

4. In a vehicle tire, a rim having a plurality of outwardly projecting members, blocks positionable between pairs of members and projecting thereabove an element carried by each projecting member and extending into the space between adjacent blocks, and a resilient member between adjacent blocks, each element and the faces of the blocks opposiing it being complementally formed to provide a wedge action on the adjacent resilient member under inward pressure on the pair of blocks, whereby said resilient member will provide a resistance against such inward movement increasing with the increase in the length of such movement, said element being in the form of an expander with its sides diverging inwardly toward the rim, adjacent blocks being recessed to receive said element and resilient member.

5. In a vehicle tire, a rim having a plurality of outwardly projecting members, blocks positionable between pairs of members and projecting thereabove, an element carried by each projecting member and extending into the space between adjacent blocks, and a resilient member between adjacent blocks, each element and the faces of the blocks opposing it being complementally formed to provide a wedge action on the adjacent resilient member under inward pressure on the pair of blocks, whereby said resilient member will provide a resistance against such inward movement increasing with the increase in the length of such movement, said element being in the form of an expander with its sides diverging inwardly toward the rim, adjacent blocks being recessed to receive said element and resilient member, said element having a width greater than the normal distance between adjacent blocks.

6. In a vehicle tire, a rim having a plurality of outwardly projecting members, blocks positionable between pairs of members and projecting thereabove, an element carried by each projecting member and extending into the space between adjacent blocks, and a resilient member between adjacent blocks, each element and the faces of the blocks opposing it being complementally formed to provide a wedge action on the adjacent resilient member under inward pressure on the pair of blocks, whereby said resilient member will provide a resistance against such inward movement increasing with the increase in the length of such movement, and resilient means between the rim and a block for supporting the bottom of the block.

In testimony whereof I affix my signature in presence of two witnesses.

JOHN J. MARSULA.

Witnesses:
W. G. DOOLITTLE,
F. E. GAITHER.

Copies of this patent may be obtained for five cents each, by addressing the "Commissioner of Patents, Washington, D. C."